(No Model.)
J. C. HERMAN.
NUT LOCK.
No. 493,213. Patented Mar. 7, 1893.
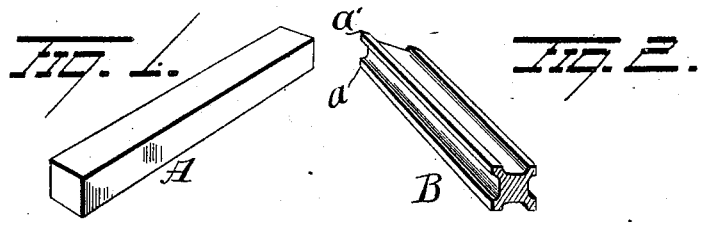
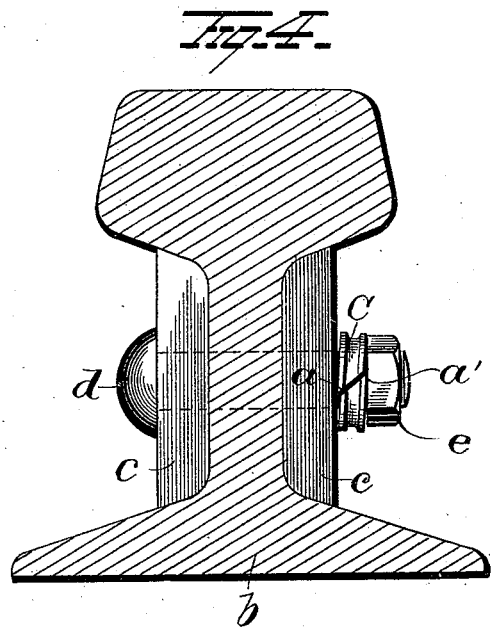
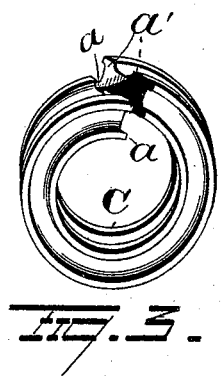
Witnesses
R. H. Nottingham
G. F. Downing
Inventor
John C. Herman
By H. A. Seymour
Attorney

UNITED STATES PATENT OFFICE.

JOHN C. HERMAN, OF ST. LOUIS, MISSOURI.

NUT-LOCK.

SPECIFICATION forming part of Letters Patent No. 493,213, dated March 7, 1893.

Application filed August 4, 1892. Serial No. 442,179. (No model.)

*To all whom it may concern:*

Be it known that I, JOHN C. HERMAN, of St. Louis, and State of Missouri, have invented certain new and useful Improvements in Nut-Locks; and I do hereby declare the following to be a full, clear, and exact description of the invention, such as will enable others skilled in the art to which it appertains to make and use the same.

My invention relates to an improvement in nut locks, and it consists of a metal blank approximately X shape in cross-section having its ends chamfered, the said blank being bent in the shape of a spiral coil so that the two biting edges of each end are in planes outside of the planes of the corresponding side edge of the opposite end.

In the accompanying drawings, Figure 1 is a view of the blank before being rolled. Fig. 2 is a view in cross-section of a rolled blank. Fig. 3 is a view of a completed nut lock, and Fig. 4 is a view of the same applied to a railway rail.

A represents a blank from which the lock is made and B the rolled blank, which latter is X-shape in cross-section, while C is the completed nut lock. The ends of blank B are chamfered as shown in the drawings, thus forming two separate and distinct biting edges $a\ a'$ at each end. After the ends of blank B have been chamfered, the blank is then bent in the shape of a spiral coil so that the biting edges $a\ a'$ of each end are in planes outside of the planes of the corresponding side edges of the opposite end.

$b$ represents a rail; $c$ the fish plates; $d$ a bolt and $e$ the nut to be locked. The rail $b$, fish plates $c$ and bolt $d$ are assembled in the usual manner, the nut lock C is then slipped over the free end of bolt $d$ and the nut $e$ screwed on the bolt. When it is desired to secure the nut $e$ against displacement, the latter is screwed until it engages the nut lock; the movement of nut $e$ is continued until the ends of the nut lock are practically in the same plane. As the nut is of spring metal the biting edges thereof bear solidly against the fish-plates and nut respectively. The nut having been driven home as described any tendency to loosen will be overcome by the biting edges $a\ a'$ of each end biting into the fish-plate and nut, thus preventing the backward movement of the nut. Any backward movement on the part of the nut $e$ would cause the biting edges $a\ a'$ of the end resting against the fish plate to bite into the latter which would hold the nut-lock against movement and cause the biting edges $a\ a'$ of the end next to the nut $e$ to grasp the latter and hold same in a stationary position.

In the nut locks heretofore constructed the chamfered ends are each provided with but one biting edge, thus it will be apparent that should the edge fail to bite into the nut the latter is liable to work loose, but with the device herein described two biting edges $a\ a'$ are formed, and should one edge fail to bite into the nut or fish-plate the remaining edge will undoubtedly perform that function. It will be observed that the biting edges $a\ a'$ are obtained by rolling the metal in the shape shown in Fig. 2, which operation causes the blank B to be X shaped in cross-section, or in other words, the four sides are concaved, and when the ends of the blank are chamfered two sharp biting edges are formed on each end.

Having fully described my invention, what I claim as new, and desire to secure by Letters Patent, is—

A nut lock X-shape in cross section having its ends chamfered forming two separate biting edges on each end, the said blank being bent in the shape of a spiral coil so that the biting edges are in planes outside of the planes of the corresponding side edges of the opposite end, substantially as set forth.

In testimony whereof I have signed this specification in the presence of two subscribing witnesses.

JOHN C. HERMAN.

Witnesses:
JNO. SWING,
H. N. MANN.